US010156189B2

(12) United States Patent
Sze et al.

(10) Patent No.: US 10,156,189 B2
(45) Date of Patent: Dec. 18, 2018

(54) COMBUSTOR IGNITER ASSEMBLY

(71) Applicant: PRATT & WHITNEY CANADA CORP., Longueuil (CA)

(72) Inventors: Robert Sze, Mississauga (CA); Kian McCaldon, Orangeville (CA); Honza Stastny, Georgetown (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 840 days.

(21) Appl. No.: 14/165,991

(22) Filed: Jan. 28, 2014

(65) Prior Publication Data
US 2015/0211420 A1 Jul. 30, 2015

(51) Int. Cl.
*F02C 1/00* (2006.01)
*F02C 7/266* (2006.01)
*F23R 3/02* (2006.01)

(52) U.S. Cl.
CPC .............. *F02C 7/266* (2013.01); *F23R 3/02* (2013.01); *F23D 2207/00* (2013.01); *F23R 2900/00012* (2013.01); *F23R 2900/00017* (2013.01); *F23R 2900/03044* (2013.01)

(58) Field of Classification Search
CPC .. F02C 7/264; F02C 7/266; F02C 7/12; F02C 7/18; F02C 7/20; F23R 3/04; F23R 3/60; F23R 3/002; F23R 2900/03043; F23R 2900/00012; F23D 2207/00
See application file for complete search history.

(56) References Cited

U.S. PATENT DOCUMENTS

| 2,701,324 | A | * | 2/1955 | Peroutky | C25D 3/24 |
| | | | | | 123/169 R |
| 3,589,127 | A | | 6/1971 | Kenworthy et al. | |
| 3,800,530 | A | * | 4/1974 | Nash | F23R 3/20 |
| | | | | | 60/761 |
| 4,999,996 | A | | 3/1991 | Duchene et al. | |
| 5,117,637 | A | | 6/1992 | Howell et al. | |
| 5,673,554 | A | * | 10/1997 | DeFreitas | F02C 7/264 |
| | | | | | 102/200 |
| 7,926,281 | B2 | | 4/2011 | Commaret et al. | |
| 8,454,350 | B2 | | 6/2013 | Berry et al. | |
| 2005/0028528 | A1 | * | 2/2005 | Hernandez | F02C 7/266 |
| | | | | | 60/752 |
| 2006/0042257 | A1 | * | 3/2006 | Stastny | F23R 3/50 |
| | | | | | 60/772 |
| 2007/0051110 | A1 | * | 3/2007 | Holland | F23R 3/06 |
| | | | | | 60/776 |

(Continued)

*Primary Examiner* — Gerald L Sung
(74) *Attorney, Agent, or Firm* — Norton Rose Fulbright Canada LLP

(57) ABSTRACT

A gas turbine engine comprising a combustor having a combustor liner assembly and a mounting bracket provided on the combustor liner assembly, a floating collar being slidingly received on the mounting bracket for relative sliding movement in a plane normal to an axis of an igniter opening in the liner assembly. The floating collar includes an annular surface defining a collar opening, and an igniter having an axis concentric with the axis of the collar opening is sealingly engages the annular surface. A plurality of purge openings defined in at least one of the igniter and the floating collar form cooling airflow passages communicating from the plenum to the cavity.

12 Claims, 8 Drawing Sheets

(56) References Cited

U.S. PATENT DOCUMENTS

2007/0068166 A1\* 3/2007 Gautier .................... F02C 3/14
 60/752
2015/0354818 A1\* 12/2015 Lebel ...................... F23R 3/002
 60/796

\* cited by examiner

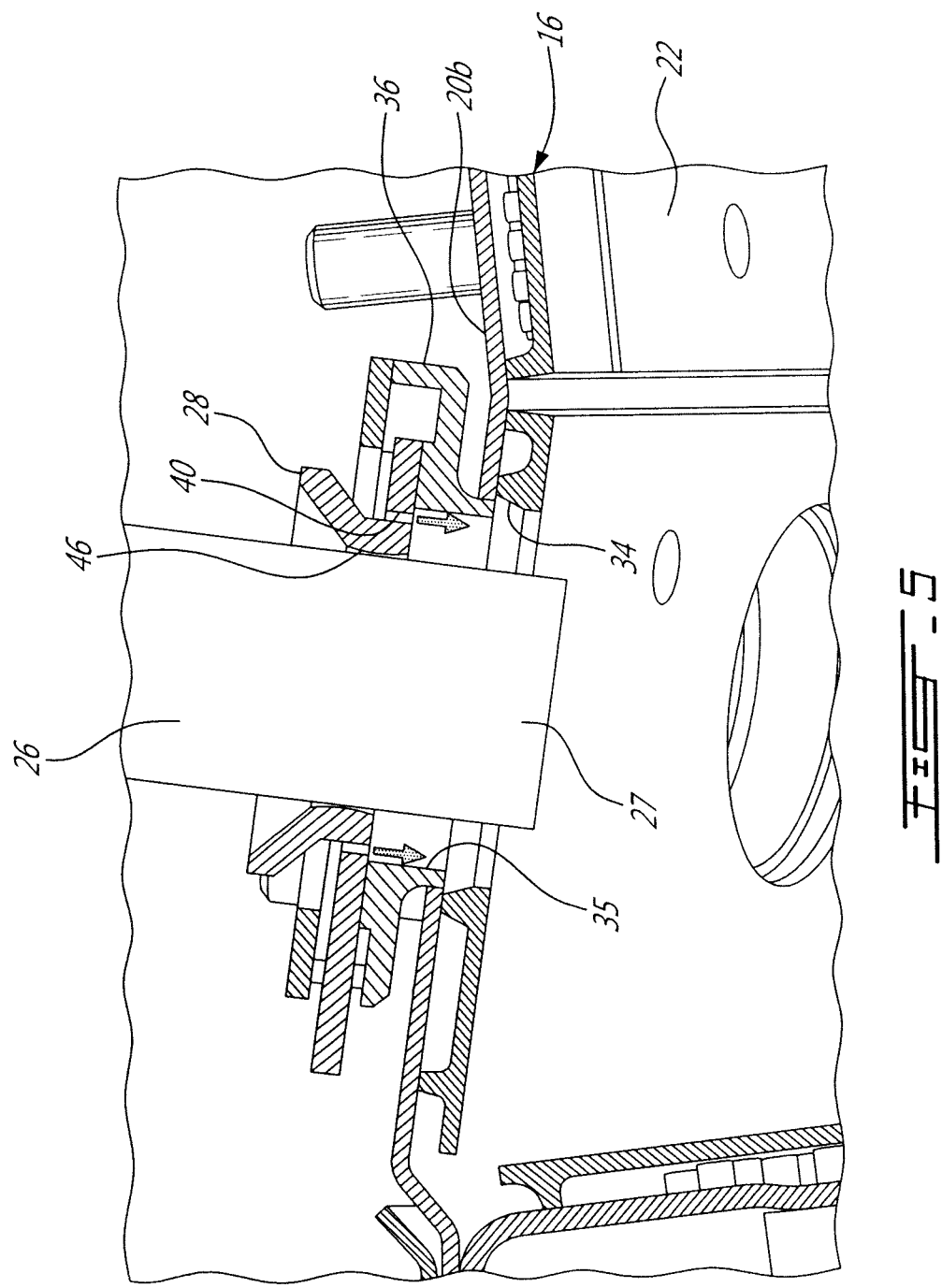

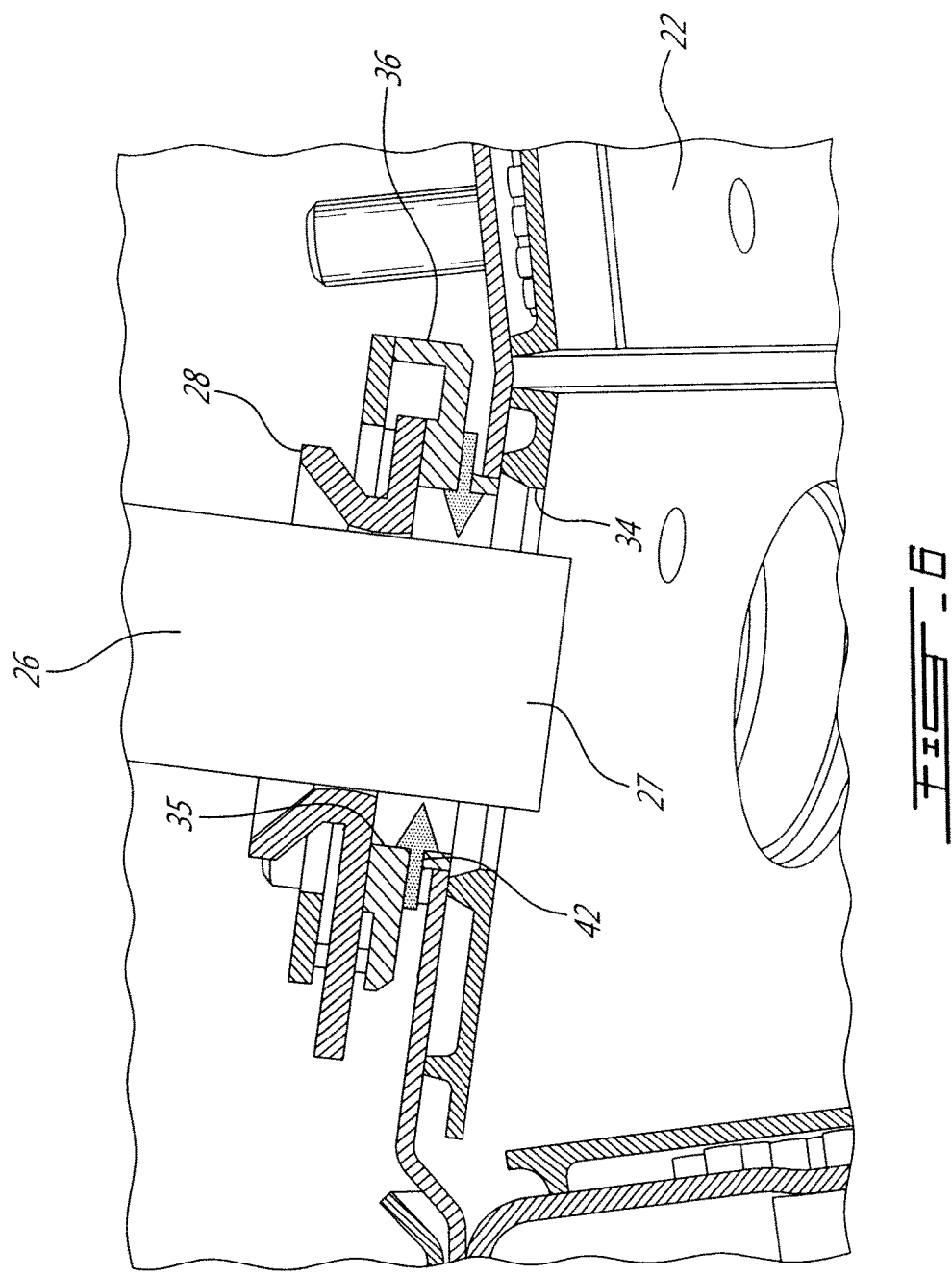

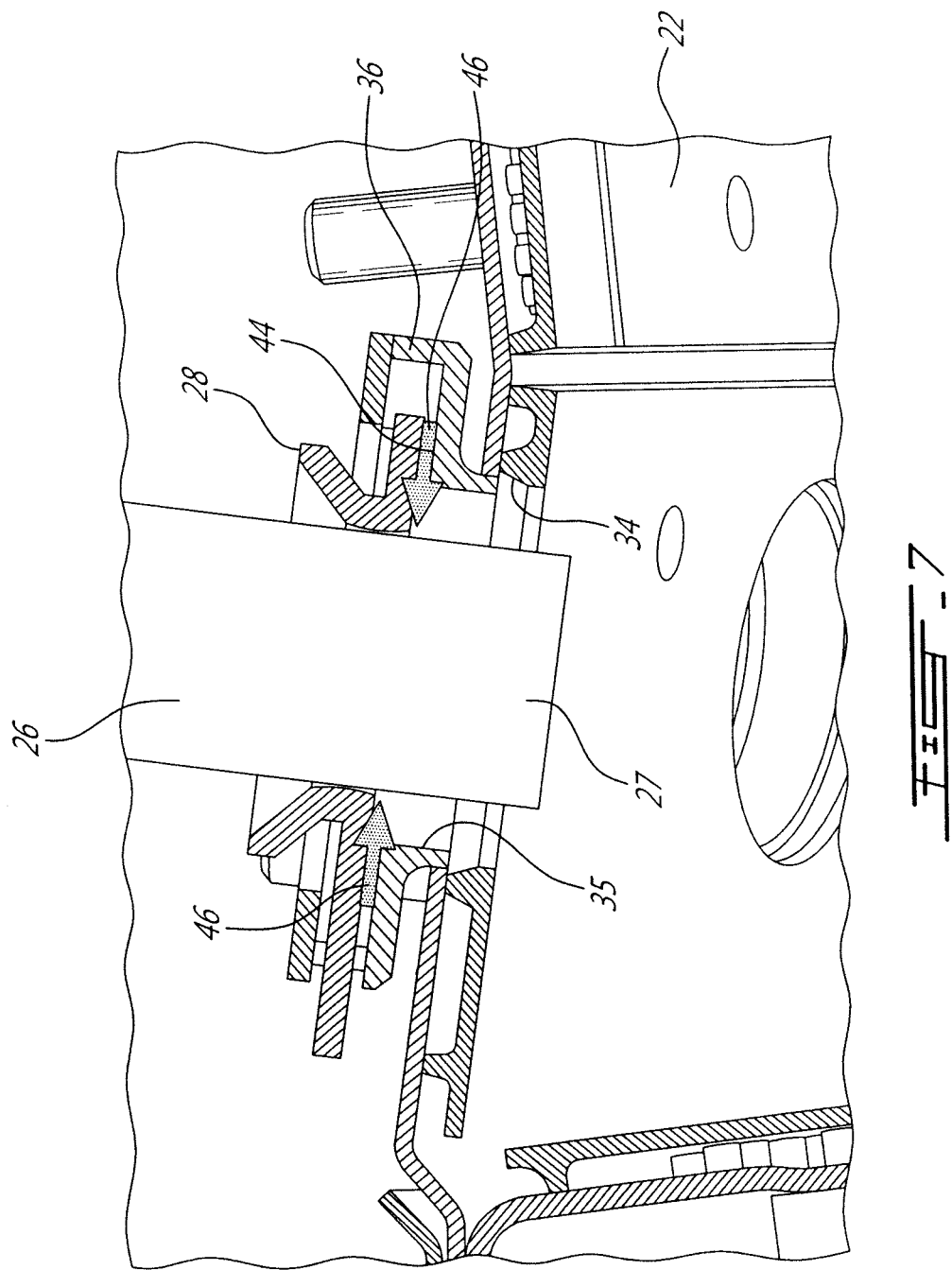

COMBUSTOR IGNITER ASSEMBLY

TECHNICAL FIELD

The described subject matter relates generally to gas turbine engines and, more particularly, to an igniter assembly for a combustor.

BACKGROUND

In a gas turbine engine, the interaction between the fuel nozzle spray and the spark from the igniter can affect the stability of the combustion process and the altitude re-ignition capability of the combustion system. The igniter tip has to be close enough to the fuel spray to spark the ignition, yet it cannot be too exposed so that it can be burnt and rendered less effective. In existing combustor designs, the igniter is typically buried in a cavity with the igniter tip barely exposed to the hot gas path. As the igniter should not take any mechanical load during the entire flight envelope, there is usually a gap provided between the igniter and the igniter cavity wall to prevent any transient or steady-state interference of the igniter and the cavity wall. However this gap can allow hot gas ingestion into the cavity and eventually burn the igniter and the surrounding panel or combustor liner.

SUMMARY

There is provided a gas turbine engine comprising: a combustor having a combustor liner assembly defining a domed combustion chamber in a plenum of the gas turbine engine, a plurality of fuel nozzles communicating through a dome of the combustor, and an igniter opening defined in the combustor liner assembly downstream from the fuel nozzles relative to a direction of air flow through the combustion chamber; a mounting bracket provided on the combustor liner assembly and including an annular lip at least partially aligned with the igniter opening such as to define a cavity receiving an igniter therein; a floating collar slidingly received on the mounting bracket for relative sliding movement in a plane normal to an axis of the igniter opening, the floating collar including an annular surface defining a collar opening; the igniter having an axis concentric with said axis of the collar opening and sealingly engaging the annular surface ; and a plurality of purge openings defined in at least one of the igniter and the floating collar, the purge openings forming cooling airflow passages communicating from the plenum to the cavity.

There is also provided a method of minimizing damage to the tip of an igniter in a combustor of a gas turbine engine, the method comprising the steps of: mounting the igniter to a liner of the combustor downstream of one or more fuel nozzles using a floating collar; providing an annular cavity surrounding the igniter tip; forming a plurality of purge openings in at least one of the igniter and the floating collar, the purge openings defining cooling airflow; and directing pressurized air from a plenum surrounding the combustor through the purge openings and into the cavity, the purge openings thereby creating cooling purge air jets.

Further details of these and other aspects will be apparent from the detailed description and figures included below.

BRIEF DESCRIPTION OF THE DRAWINGS

Reference is now made to the accompanying figures in which:

FIG. 5 is a fragmentary, perspective, cross-sectional view showing a detail in accordance with still another embodiment of the present disclosure;

FIG. 6 is a fragmentary, perspective, cross-sectional view showing a detail in accordance with yet another embodiment of the present disclosure;

FIG. 7 is a fragmentary, perspective, cross-sectional view showing a detail in accordance with a further embodiment of the present disclosure;

DETAILED DESCRIPTION

Figure 1:
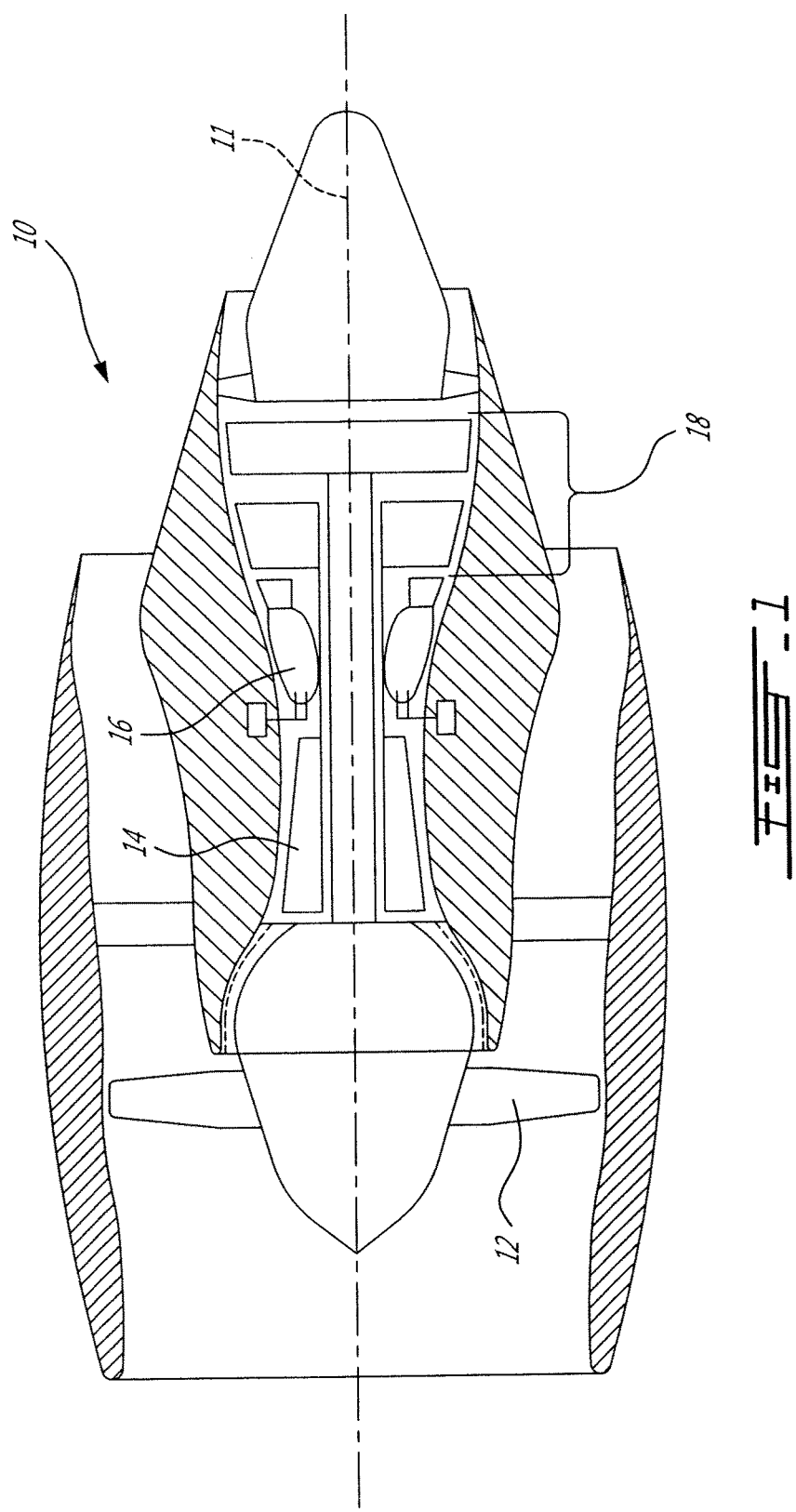
FIG. 1 is a schematic cross-sectional view of a gas turbine engine illustrating the turbofan configuration.

FIG. 1 illustrates a gas turbine engine 10 of a type preferably provided for use in subsonic flight, generally comprising in serial flow communication: a fan 12 through which ambient air is propelled; a compressor section 14 for pressurizing the air; a combustor 16 in which the compressed air is mixed with fuel and ignited for generating an annular stream of hot combustion gases; and, a turbine section 18 for extracting energy from the combustion gases. The fan 12, compressor section 14, combustor 17 and turbine 18 are all positioned concentrically about a common central longitudinal axis 11 of the gas turbine engine 10.

Figure 2:
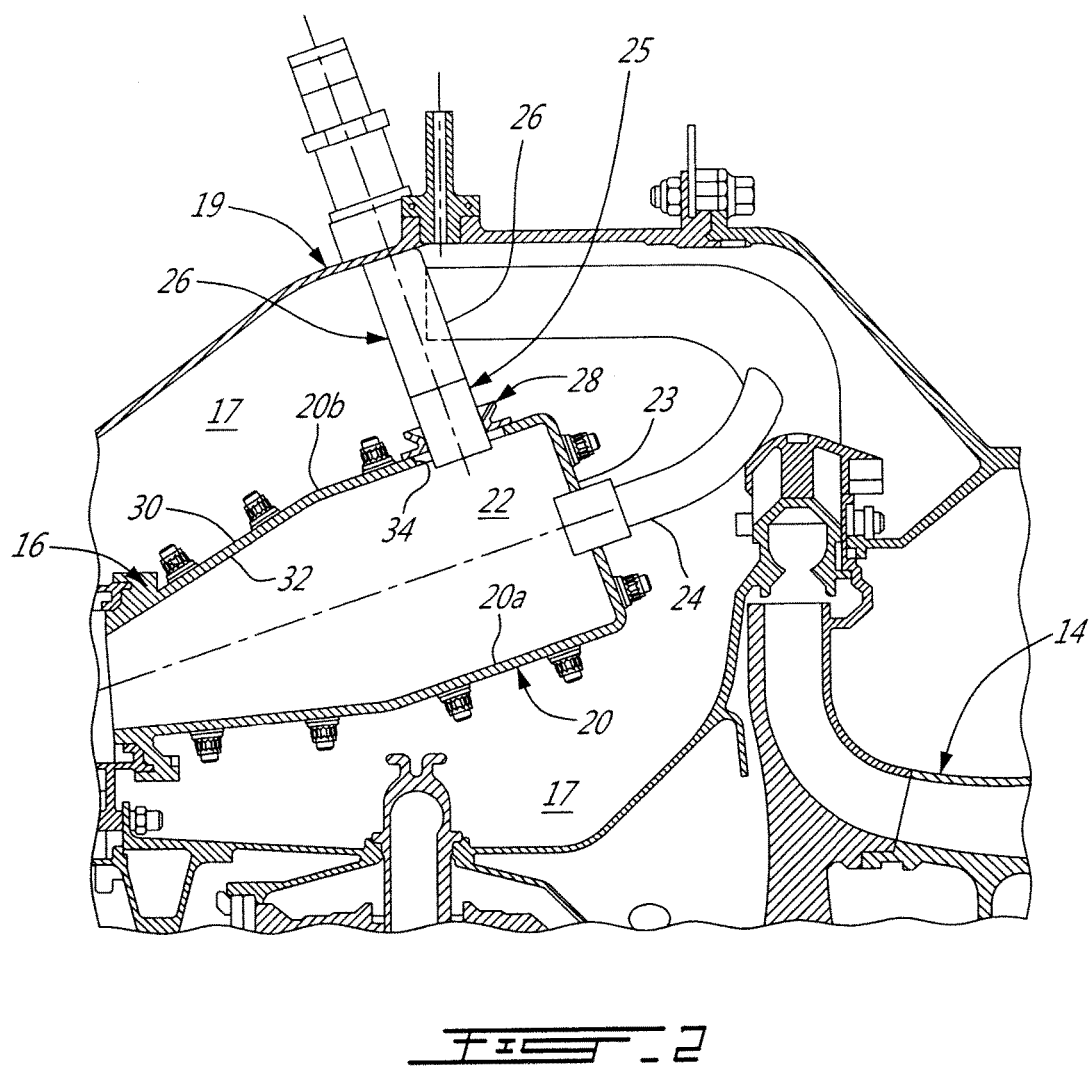
FIG. 2 is a partly fragmented axial cross-sectional view showing a combustor having an igniter assembly in accordance with one embodiment of the present disclosure.

Referring to FIG. 2, the combustor 16 is housed within a plenum 17 that is defined and enclosed by a case 19 of the gas generator portion of the engine. The plenum 17 is supplied with compressed air from the compressor 14 located upstream of the combustor and gas generator portion. The combustor 16 comprises an annular combustor shell 20, typically composed of a radially inner liner 20a and a radially outer liner 20b, each having a wall 30, 32 respectively, defining a combustion chamber 22 within the combustor 16. A dome panel 23 is provided at the upstream end of the combustor 16. A plurality of circumferentially spaced-apart fuel nozzles 24 are mounted in the dome panel 23 for delivering a fuel-air mixture into the combustion chamber 22.

Figure 3:
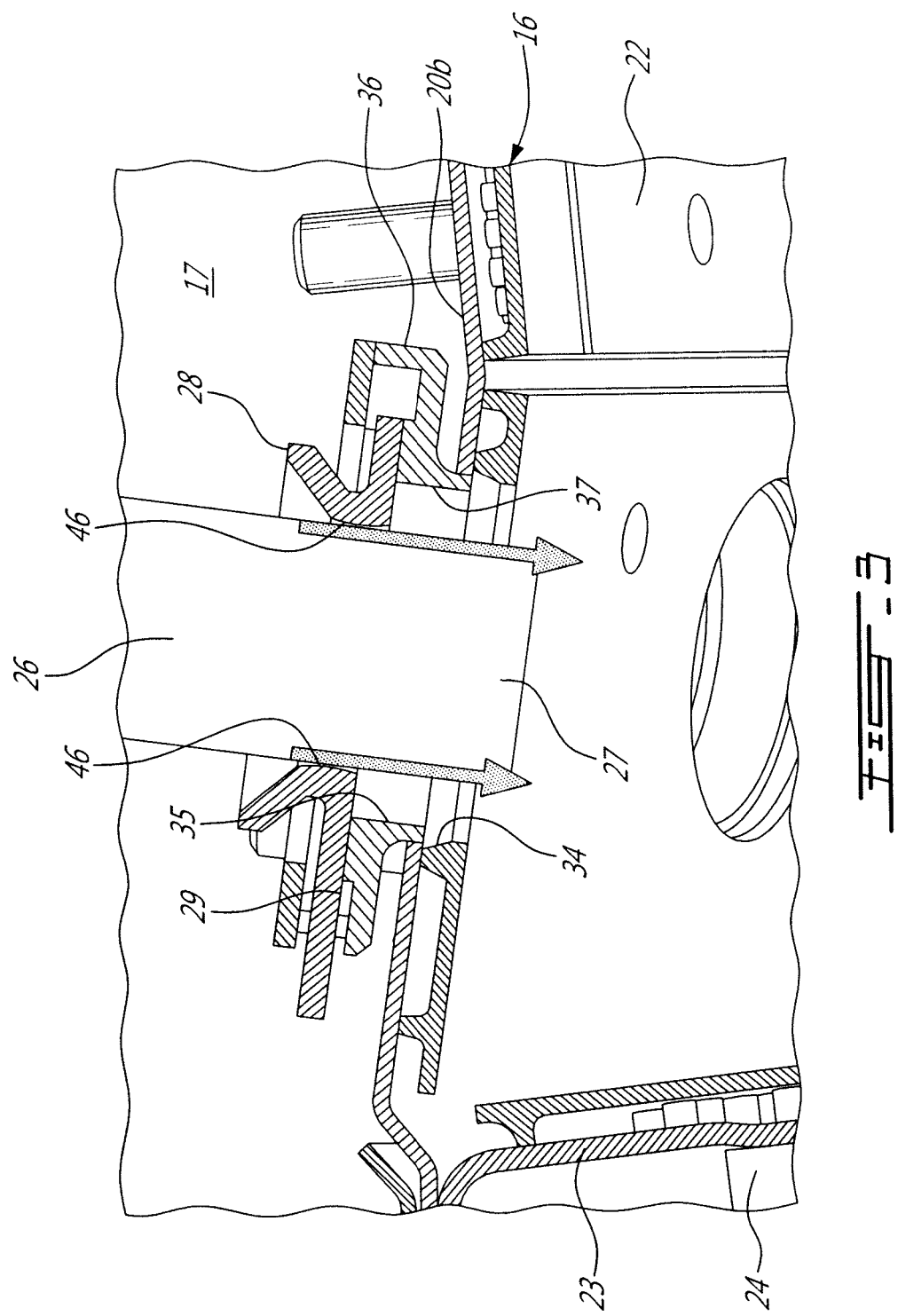
FIG. 3 is a fragmentary, perspective, cross-sectional view showing a detail in accordance with an embodiment of the present disclosure.

A plurality of circumferentially spaced-apart openings 34 are provided in at least the outer liner 20b of the combustor 16. An igniter assembly 25 is mounted on the liner 20b, at each opening 34, for igniting the fuel air mixture delivered by the fuel nozzles 24 in the chamber 22. The igniter assembly 25 includes at least an igniter 26 and a floating collar 28. The floating collar 28 is held to the combustor liner 20b by a mounting bracket 36 fixedly attached to the liner 20b. As shown in FIG. 3 and FIG. 5, the mounting bracket 36 is provided on the combustor liner 20b and includes an annular lip 37 which is at least partially aligned within the opening 34 so as to define a cavity 35, circumscribed by the opening 34 and the lip 37, for receiving a tip 27 of the igniter 26. The floating collar 28 slides laterally on an interface surface 29 formed on the mounting bracket 36, and therefore the floating collar is able to slide relative to the mounting bracket in a plane normal to the axis of the igniter opening 34. The collar 28 also includes an annular surface 46 defining a collar opening in which the igniter 26 is mounted. The interface between the annular surface 46 and the igniter 26 may be less than 0.010" in radius, or within sealing tolerances. The floating collar 28 is therefore mounted between the combustor liner 20b and the igniter 26 to provide a seal therebetween, while allowing the igniter 26 to move relative to the combustor liner 20b. The floating collar 28 and the collar mounting bracket 36 may be advantageously fabricated by metal injection moldings (MIM), although other methods of manufacture may be used to form the floating collar 28 and mounting bracket 36. The purge bores and slots, to be described, may be formed without resorting to more expensive machining processes.

Figure 4A:
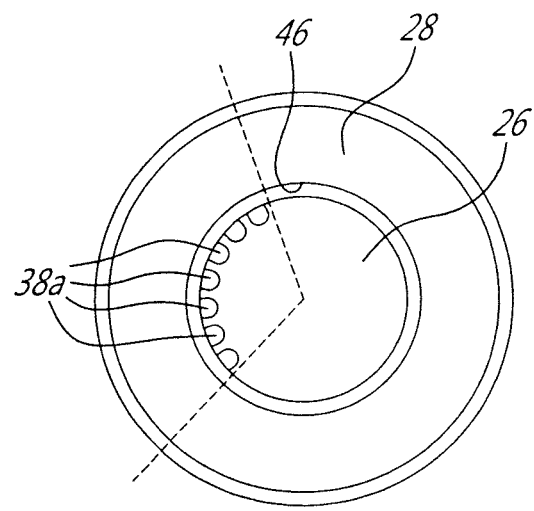
FIG. 4a is a fragmentary, schematic, enlarged view of a detail in accordance with the embodiment shown in FIG. 3.

In order to prevent the hot gases in the dome region of the combustor chamber 22 from damaging the tip 27 of the igniter 26, cool air, designated here as purge air, coming from the pressurized plenum 17 is directed to the igniter cavity 35 surrounding the igniter tip 27. As shown in FIGS. 3 and 4a, the purge air flow can flow from the plenum 17 to the cavity 35 by means of a plurality of purge slots 38a defined axially on the circumference of the sheath of the igniter 26. These purge slots may also be impingement slots, in that they may be used be used to direct purge and/or inpingement airflow therethrough. The purge slots 38a would preferably be provided on the upstream side of the igniter 26 in a sector not exceeding an arc of 120°. In one specific example, which is exemplary only, seven purge slots 38a are provided within an arc of 90°.

Figure 4B:
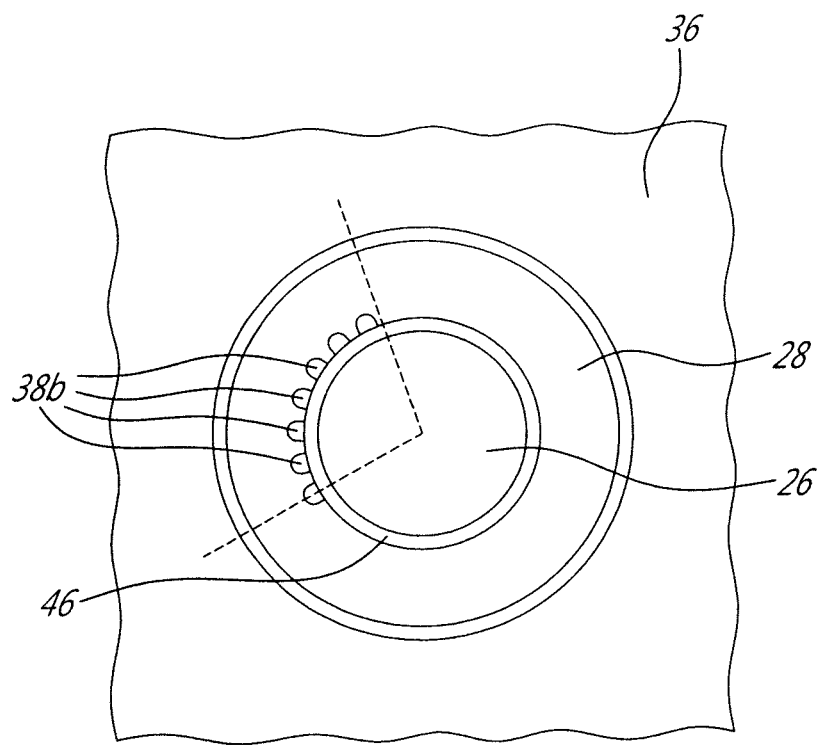
FIG. 4b is a fragmentary, schematic, enlarged view of a detail similar to FIG. 4a, but in accordance with another embodiment.

As an option to the configuration shown in FIGS. 3 and 4a, the purge slots 38b may be alternately provided in the annular surface 46 of the floating collar 28, as shown in FIG. 4b. In both cases, however, the purge slots 38a and 38b extend axially relative to the igniter 26 such as to provide cooling air flow between the igniter 26 and the surrounding floating collar 28.

It is also to be understood that the purge air slots as described herein, which are used to direct cooling purge air into the cavity 35 proximate the tip 27 of the igniter 26, may comprise bores or slots having a number of cross-sectional profiles, such as circular, semi-circular, rectangular, etc. Regardless, they extend through at least one of the floating collar and the igniter wall surface such as to ensure fully uninterrupted cooling air flow paths in each of the passages formed by these slots and therefore provide cooling airflow communication between the cavity 35 of the igniter tip 27 and the plenum 17 surrounding the combustor 16.

According to the alternate embodiment shown in FIG. 5, the purge air flow may be introduced to the cavity 35 through a plurality of discrete purge bores 40 provided in the collar 28. The purge bores 40 are provided on the upstream side of the igniter assembly. These bores 40 may be axial and therefore parallel to the axis of the igniter 26. The purge bores 40 direct the purge air flow to the cavity 35 formed in the mounting bracket 36 surrounding the igniter tip 27. In one example, 7 slots were provided in a sector contained by a 90° arc. The sector could be up to an arc of 120° with anywhere from 10 to 20 purge bores 40. It has also been contemplated to angle the purge bores 40 to between 30° and 55° with the axis of the igniter 26. The selection of the angle and number of purge bores 40 depends on the amount of purge air available and the area that needs to be protected.

The embodiment shown in FIG. 6 shows purge bores 42 defined in the mounting bracket 36. The radial bores 42 are directed to the cavity 35, in order to deliver the flow of purge air to this area. A cluster of 10 to 20 purge bores 42 were arranged in a sector covering an arc of 120°, on the upstream side of the igniter 26.

Figure 7A:
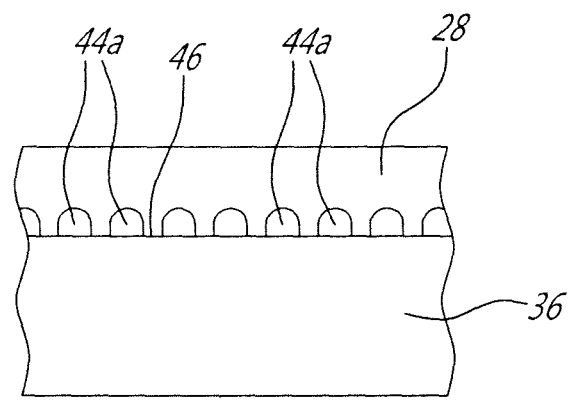
FIG. 7a is a fragmentary, enlarged, schematic view of a detail in FIG. 7 according to one version of the embodiment therein.
Figure 7B:
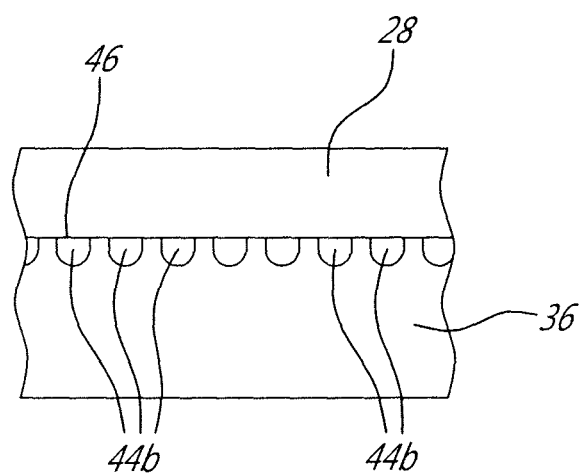
FIG. 7b is a fragmentary, enlarged, schematic view of a detail in FIG. 7 according to another version of the embodiment therein.

FIGS. 7, 7a, 7b illustrate radial purge slots 44 formed between the mounting bracket 36 and the floating collar 28 at the sealing interface 46 between the two parts. As shown in FIG. 7a, the purge slots 44a are formed in the floating collar 28. Alternatively, the purge slots 44b are provided in the mounting bracket 36 at the interface 46.

The purge bores 42 or the purge slots 44 could be arranged at an angle tangential to the periphery of the cavity 35. This would allow the purge air flow area to cover a larger area.

The above description is meant to be exemplary only, and one skilled in the art will recognize that changes may be made to the embodiments described without departing from the scope of the described subject matter. For example, the purge openings may be the form of slots defined in one of the igniter and the annular surface of the floating collar at the interface thereof, coaxial with the axis of the opening, for providing the flow of purge air. In another embodiment, the purge openings may be the form of purge bores in the floating collar for passing the flow of purge air from the plenum to the cavity. In all cases the full combustor ΔP causes the purge air flow through the purge openings, which create cooling purge air flow jets through the igniter assembly such as to cool the igniter tip. Modifications which fall within the scope of the described subject matter will be apparent to those skilled in the art, in light of a review of this disclosure, and such modifications are intended to fall within the appended claims.

The invention claimed is:

1. A gas turbine engine comprising: a combustor having a combustor liner assembly defining a combustion chamber along a chamber axis in a plenum of the gas turbine engine, a plurality of fuel nozzles communicating through a dome of the combustor, and an igniter opening defined in the combustor liner assembly downstream from the fuel nozzles relative to a direction of air flow through the combustion chamber; a combustor ignitor assembly including: a mounting bracket provided on the combustor liner assembly and including an annular lip at least partially aligned with the igniter opening such as to define a cavity receiving an igniter therein; a floating collar slidingly received on the mounting bracket for relative sliding movement in a plane normal to an axis of the igniter opening, the floating collar including an annular surface defining a collar opening; the igniter having an igniter axis extending longitudinally thereof concentric with an axis of the collar opening and sealingly engaging the annular surface; and a plurality of purge openings defined in at least one of the igniter and the floating collar, the purge openings forming cooling airflow passages communicating from the plenum to the cavity, wherein the floating collar and the mounting bracket comprise planar surfaces, normal to the axis of the igniter, which provide relative displacement therebetween such that the floating collar slides at an interface with the mounting bracket, a bisecting plane extending along the igniter and at an angle to the chamber axis such that the igniter axis lies in the bisecting plane, the purge openings confined within an arc disposed upstream of the bisecting plane relative to the direction of air flow within the combustion chamber, the igniter assembly being free from the purge openings downstream of the bisecting plane relative to the direction of air flow within the combustion chamber.

2. The combustor igniter assembly as defined in claim 1, wherein the purge openings comprise slots coaxial with the axis of the collar opening for providing the flow of purge air.

3. The combustor igniter assembly as defined in claim 1, wherein the purge openings are within the floating collar and comprise purge bores extending through the floating collar for feeding the flow of purge air from the plenum to the cavity.

4. The combustor igniter assembly as defined in claim 1, wherein the arc spans less than 120°.

5. The combustor igniter assembly as defined in claim 4, wherein the arc is at least 90°.

6. The combustor igniter assembly as defined in claim 3, wherein the purge bores extend through the floating collar at angle to the igniter axis of the igniter in a range between 0° and 55°, wherein 0° is parallel to the axis of the collar opening.

7. The combustor igniter assembly as defined in claim 2, wherein the slots are tangential to the periphery of the cavity.

8. The combustor as defined in claim 7, wherein the purge openings are within the floating collar and the slots are formed in the planar surface of the floating collar.

9. The combustor as defined in claim 7, wherein the slots are formed in the planar surface of the mounting bracket.

10. The combustor as defined in claim 1, wherein the purge openings comprise purge bores extending radially through the mounting bracket from the plenum to the cavity.

11. The combustor igniter assembly as defined in claim 10, wherein the purge openings are tangential to the periphery of the cavity.

12. The combustor igniter assembly as defined in claim 1, wherein the purge openings comprise slots defined at the interface which are directed to the cavity.

* * * * *